United States Patent [19]

Ritchey, Jr.

[11] 3,723,668

[45] Mar. 27, 1973

[54] METHOD OF ERASING SIGNALS FROM MAGNETIC DISCS USING DC PULSES WHICH PERSIST FOR ONE DISC REVOLUTION

[75] Inventor: Thomas W. Ritchey, Jr., Palo Alto, Calif.

[73] Assignee: Ampex Corporation, Redwood City, Calif.

[22] Filed: Mar. 27, 1970

[21] Appl. No.: 23,322

Related U.S. Application Data

[63] Continuation of Ser. No. 722,318, April 18, 1968, abandoned.

[52] U.S. Cl. ..........................................179/100.2 D

[51] Int. Cl. ..........................G11b 5/02, G11b 25/04

[58] Field of Search................179/100.2 D; 335/284; 317/157.5

[56] References Cited

UNITED STATES PATENTS

| | | | |
|---|---|---|---|
| 2,962,560 | 11/1960 | Folse | 179/100.2 D |
| 2,846,518 | 8/1958 | Goehner | 179/100.2 D |
| 2,766,328 | 10/1956 | Handschin et al. | 179/100.2 D |
| 3,156,784 | 11/1964 | Kump | 179/100.2 D |

*Primary Examiner*—Bernard Konick
*Assistant Examiner*—Alfred H. Eddleman
*Attorney*—Robert G. Clay

[57] ABSTRACT

A method for selectively erasing single tracks of recorded signals from a magnetic disc and reconditioning the medium for re-recording. Erasure is effected by energizing a head with successive pulses of direct current alternating in the direction of current flow at decreasing levels of absolute magnitude, each pulse persisting for the duration of one disc revolution. The method further lends itself to track erasure using a read/write head.

11 Claims, 4 Drawing Figures

INVENTOR.
THOMAS R. RITCHEY JR.
BY Thomas Schatzel
ATTORNEY

INVENTOR.
THOMAS R. RITCHEY JR.

BY Robert G. Clay

ATTORNEY

METHOD OF ERASING SIGNALS FROM MAGNETIC DISCS USING DC PULSES WHICH PERSIST FOR ONE DISC REVOLUTION

This application is a continuation of copending application Ser. No. 722,318, filed Apr. 18, 1968, and now abandoned.

BACKGROUND OF THE INVENTION

Various magnetic recording and reproducing systems utilize a magnetic disc as the recording medium. For example, a magnetic disc may be employed as a temporary storage buffer of television images of documents in a document filing and retrieval system. In this regard, each document may be magnetically stored on one or more concentric recorded tracks of the disc. Frequently, it is desirable to erase single document images from the disc entailing the erasure of single tracks. It is also desirable that during the erasure, the disc segments associated with the tracks be reconditioned for re-recording. To date, various methods have been proposed to accomplish this erasure. Typically, there has been the selective application of radio frequency current to the record and/or playback head, or to a separate erase head. However, the frequency of the erase current is prohibitively high unless the rotational velocity of the disc is slowed down considerably from its normal record or playback velocity. For a rapid filing and retrieval system, a disc slowdown is undesirable and the radio frequency of the erase current which must be employed at the normal disc speed results in high electrical losses in a practical design. Thus, conventional high frequency erase methods have proven unsatisfactory. The use of conventional direct current erase methods, on the other hand, while being effective to erase the existing recorded signal from the disc leave an intolerable amount of magnetic remanence on the disc, i.e. magnetic polarization of the magnetic dipole. This manifestly contributes to second harmonic distortion of re-recorded signals on the disc.

SUMMARY OF THE INVENTION

The present invention relates to a method for single track erase of a magnetic disc which overcomes the limitations and disadvantages experienced with both conventional radio frequency and direct current erase methods. The system provides reliable erasure at normal disc speeds with negligible power loss and with near zero magnetic remanence of the recording medium such that there is a negligible contribution of harmonic distortion to a re-recorded signal.

The present erasure method calls for generation of a stepped erase current waveform of successive pulses. The pulses are of progressively decreasing levels of constant current in the direction of current flow. The time period of each pulse coincides with the duration of one disc revolution. In response to an erase command generated from auxiliary control equipment, the erase current waveform is applied to transducing means which may be in the form of a magnetic head positioned adjacent to the surface of the magnetic disc and in transducing relationship with the tracks to be erased. Such transducing means may be an existing read/write head which may be stepped radially under the direction of the auxiliary control equipment to record or read signals from concentric tracks of the disc. When the head is energized with the erase current waveform, the level of the first step is such as to provide good erasure of the signal of the underlying recorded track during the first disc revolution. During the second revolution, a pulse of constant current at a decreased magnitude and in an opposite direction of flow is applied to reduce the remanence of record medium associated with the track. During successive disc revolutions, successive pulses of progressively decreasing levels of constant current alternating in the direction of current flow are applied to more completely erase the recorded signal and reduce the remnant polarization of the disc associated with the track. The number of successive pulses in the erase current waveform depends upon the degree of remanence and level of second harmonic distortion of a re-recorded signal which can be tolerated.

DESCRIPTION OF PREFERRED EMBODIMENTS

The present invention has been found to be useful with a system in which documents may be filed and retrieved using video techniques. Basically, in such a system documents to be filed and retrieved are recorded on magnetic tape. When retrieval is desired, the recorded segment of the tape is replayed and the signal is temporarily recorded on selected tracks of a magnetic disc for reproduction and display on a video screen. The disc retains the recorded signal so long as display is desired. When display is no longer desired, the selected disc tracks on which the document was recorded are erased allowing re-recording of these tracks with signals of other documents.

Figures 1, 2, 3:
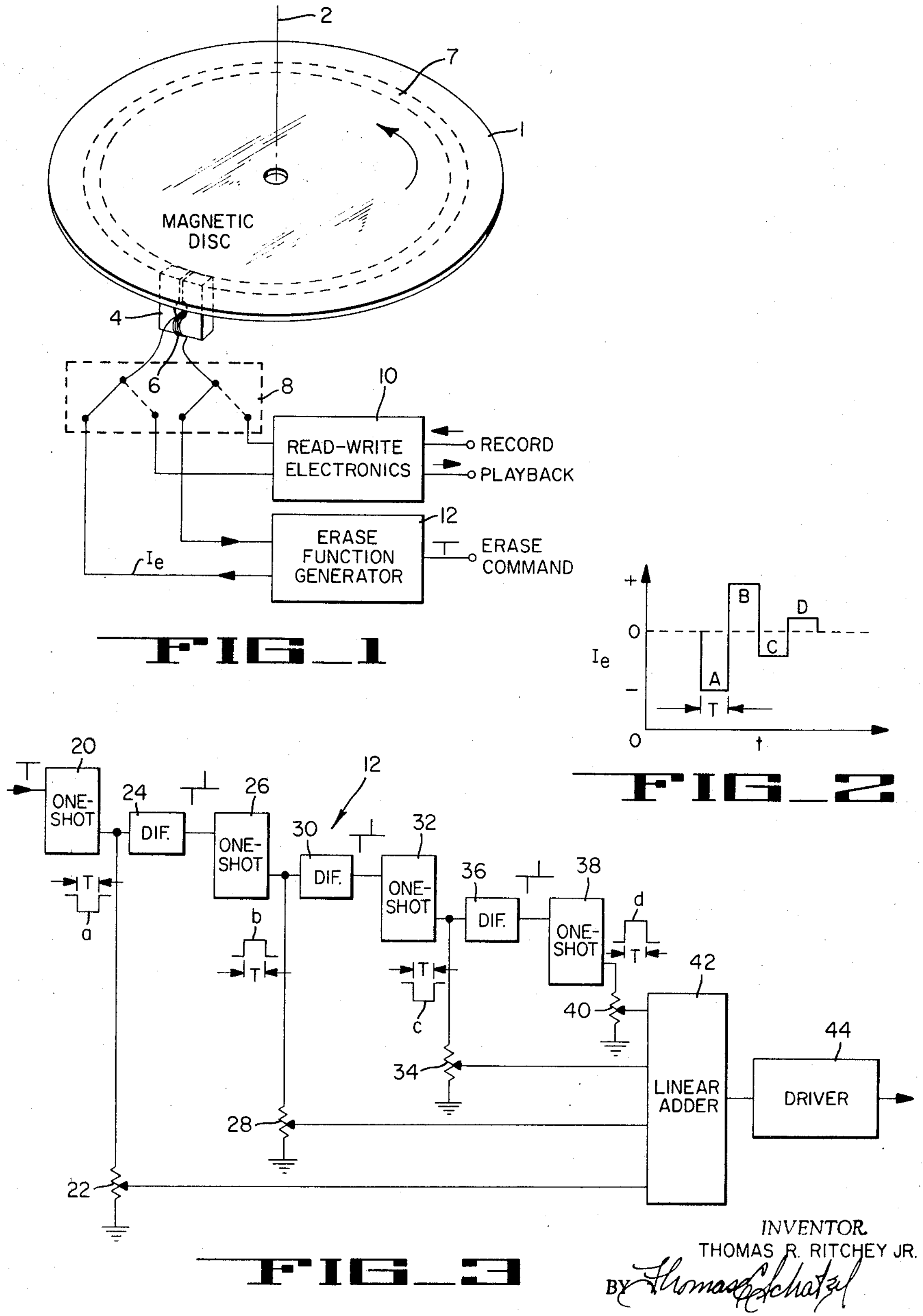
FIG. 1 is a schematic illustration of a single track erase system which may be incorporated in practicing the method of the present invention.
FIG. 2 is a graphical representation of the erase current wave form employed in the system of FIG. 1.
FIG. 3 is a block diagram of an erase current function generator which may be employed in the system of FIG. 1 to generate the erase current waveform of FIG. 2.

FIG. 1 illustrates in diagrammatic form a magnetic disc 1, e.g., a nickel-cobalt plated disc, which may be designed to accommodate a document retrieval system. As is well known in the art, the disc is driven to rotate on its axis 2. A read/write, erase magnetic head 4 is positioned such that its non-magnetic transducing gap, which in FIG. 1 is enlarged for illustrative purposes, is adjacent to the disc for transducing electrical signals to magnetic signals on the disc. Successive tracks, concentric with the disc axis 2, are recorded. The head 4 carries an energizing coil 6 energized with read/write or erase electrical signals depending upon the operational mode. In the write (record) mode a track 7, concentric with the disc 1, is established. During read (playback), the recorded signals of the track 7 are sensed and transduced to corresponding electrical signals in the coil 6. The energizing coil 6 joins a double-pole-double-throw switch 8 extending to a read/write electronics bay 10 and erase function generator 12. The position of the switch 8 is dependent upon the desired mode of operation, i.e., erase or read/write. The external terminals of the read/write electronics 10 carries the record and playback intelligence. The external terminal of the function generator 12 receives an erase command when it is desired to provide the appropriate erasing current $I_e$.

The erasing current $I_e$ applied to the magnetic head is generated within the erase function generator 12. The waveform of $I_e$ is ideally depicted in FIG. 2. The waveform of FIG. 2 may be viewed as a series of successive pulses of direct current alternating in the direction of current flow and reducing in absolute magnitude. The time period T for each pulse is selected to coincide with the time for one revolution of the magnetic disc 1. For example, when it is desired to erase a track previously recorded on the disc, such as the depicted track 7, a current pulse A is applied. This pulse remains on for one revolution of the disc. Upon completion of the first revolution, a current pulse B, whose direction of flow is opposite to that of A at a reduced absolute magnitude, is applied to the magnetic head located over the same track for the second revolution. Depending upon the degree of desired erasure, i.e., the maximum remanence and second harmonic distortion of re-recorded signals that can be tolerated, the erase current waveform $I_e$ may include further pulses of direct current alternating in the directions of current flow at reduced absolute magnitudes. For example, during a third revolution, a current pulse C may be applied and if a fourth revolution is desired a current pulse D may be applied and so on. Upon completion of the revolution with last current pulse, the head 4 may be stepped radially to another track to be erased or be switched to the record mode for re-recording the previously erased track.

FIG. 3 illustrates in block diagram form a logic arrangement for the erase function generator 12 designed to provide four successive pulses. The generator may include a series of one-shot or monostable multivibrators of opposite polarity, i.e., successive one-shots alternate between PNP and NPN characteristics, and including means for adjusting the magnitude of each of the generated pulses. More explicitly, the erase command is received at an input terminal to a one-shot 20. The one-shot 20 is triggered by the command pulse and switches to its unstable state. The one-shot 20 is designed to remain in the unstable state for the time period T coinciding with the time for one revolution of the disc 1. The output pulse, designated *a*, is received by an amplitude adjustment 22 illustrated in the form of a potentiometer. The pulse *a* is also received by a differentiator network 24 which responds to the leading and trailing edges of the pulse *a* and provides a trigger pulse to a one-shot 26. The one-shot 26 may be designed to be of opposite polarity to that of the one-shot 20. Thus, the one-shot 26, responsive to the positive trigger pulse and coinciding with commencement of the second revolution of the disc 1, switches to its unstable state. The one-shot 26 remains in the unstable state for a time period T. The output pulse, designated *b* and of opposite polarity from *a*, is received by a potentiometer 28 and a differentiator network 30. The differentiator network 30 provides a trigger pulse to a one-shot 32 of the same polarity as the one-shot 20. Accordingly, a pulse *c* similar to *a* is generated and is received by a third amplitude adjustment 34 and a differentiator 36. The output of the differentiator 36 is received by a one-shot 38 of the same polarity as the one-shot 26. A waveform *d* similar to *b* is generated and received by a fourth amplitude adjustment 40.

The potentiometers 22, 28, 34 and 40 control the amplitude of the associated pulses *a*, *b*, *c* and *d*. The amplitude adjusted pulses are received by a linear adder network 42. The network 42 provides a continuous output signal in turn received by a driver network 44. The output of the driver 44 may take the form of FIG. 2.

Accordingly, in the present invention when it is desired to read or write intelligence form or on the disc 1 the switch 8 is placed in the proper position so as to the in the read/write electronics 10 with the head 4. When it is desired to discontinue the read or write operation and to erase the recorded tracks, a command signal is applied to the switch 8 and the erase function generator 12. The DC erase current, at the successive decreasing levels and opposite directions of current flow, are applied to the energizing coil 6. By utilizing the method of applying the DC current to the track to be erased for repeated revolutions, the remanence of the disc is reduced. The reduction in remanence results in a decrease of second harmonic distortion of the next signal recorded over the same tracks. The number of successive pulses of the erase current waveform and the magnitude of each pulse depends upon various factors including the nature of the disc and the degree of second harmonic distortion which can be tolerated. The magnitude may be adjusted by the potentiometers 22, 28, 34 and 40. The first pulse amplitude is adjusted for complete erasure (approximately −60 db) and the second pulse amplitude is adjusted to obtain minimum second harmonic distortion on a re-recorded signal. To date, it has been found desirable that the magnitude of successive current pulses be approximately two-thirds that of the preceding current pulse. For example, the magnitude of current pulse B would be approximately two-thirds that of current pulse A, current pulse C approximately two-thirds that of B, and D approximately two-thirds that of C. Furthermore, the number of successive current pulses of the waveform is dependent upon the specific application. In various applications it has been found that the application of two successive current pulses is sufficient.

Figure 4:
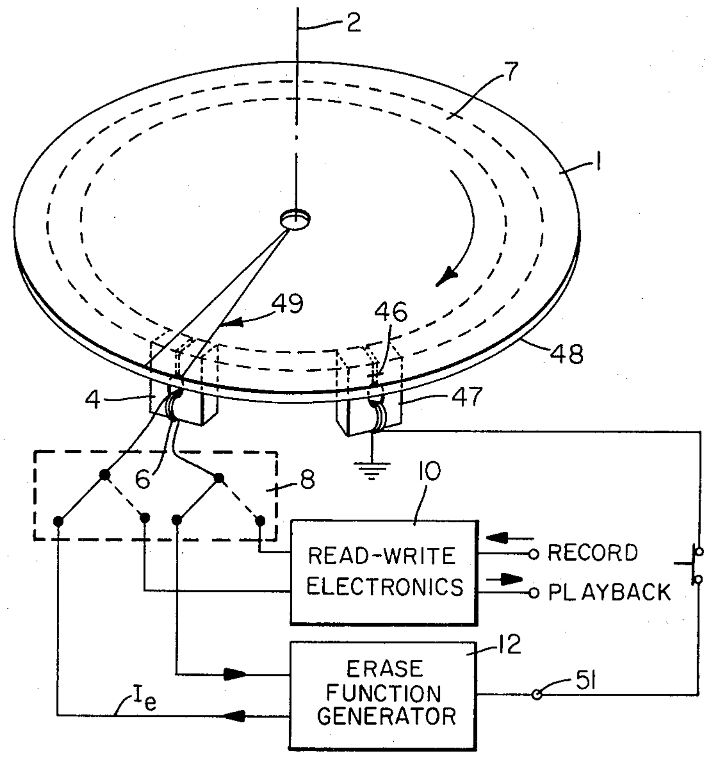
FIG. 4 is a schematic illustration of another single track erase system which may be incorporated in practicing the method of the present invention.

FIG. 4 illustrates a single track erase system which enables the sequence of track erase steps to be synchronized to the revolution of a particular location on the magnetic disc 1. A magnetic disc commonly carries a detectable mark 46, usually, designated as a "once-around-tach." In disc type magnetic recording end reproducing systems, this once-around-tach 46 is detected and used to servo the discs drive motor whereby the speed of rotation of the disc is precisely controlled and to synchronize the operation of electronic information processors to the rotation of the disc during recording and reproducing operations. Generally, either an optically detectable mark or a magnetically reproducible mark is employed as the once-around-tach 46. The embodiment of FIG. 4 illustrates the use of a magnetically reproducible mark once-around-tach 46.

The once-around-tach 46 is reproduced by a reproduce magnetic head 47 fixed in position relative to the disc 1 at the radial location of the recorded once-around-tach 46. Usually, the once-around-tach 46 is recorded adjacent to the periphery 48 of the disc 1 in its own circular track at a particular circumferential location about disc 1. Since the once-around-tach 46 is detected to synchronize the operation of the electronic record processor with the revolution of the magnetic disc 1, the once-around-tach 46 can be advantageously employed to sychronize the operation of the erase function generator 12 so that the transitions between erase pulses of current of opposite flow directions will occur while the erase magnetic head 4 is within a disc sector 49 in which no meaningful information is recorded. For example, when recording video information on the magnetic disc 1, the frame pulse associated with each frame of video information is commonly employed as the reference signal against which the once-around-tach 46 is compared for servoing the rotation of the disc 1 and synchronizing the operation of the electronic processing system. Since the once-around-tach 46 is employed to synchronize the operation of the electronic processing system, during recording operations, the once-around-tach 46 will be positioned for detection by reproduce magnetic head 47 at the same time that the vertical blanking interval associated with a single frame of video information is being recorded by the read/write, erase magnetic head 4. This vertical blanking interval does not include video information.

During erase operations, the once-around-tach 46 is reproduced from the disc 1 by the reproduce magnetic head 47. The reproduce magnetic head 47 is coupled to the erase command terminal 51 of the erase function generator 12 whereby the once-around-tach 46 is employed as the erase command to initiate the generation of the erase current to form $I_e$. By employing the once-around-tach 46 to initiate the generation of the erase current waveform, $I_e$, the erase current waveform will be synchronized to the rotation of the magnetic disc 1, hence, of the non-information bearing disc sector 49. By synchronizing the generation of the erase current waveform, $I_e$, to the rotation of the sector 49, the transitions between erase pulses of direct current of opposite flow direction will occur while the erase magnetic head 4 is adjacent the sector 49, hence, in transductional relation with the location of the recorded non-information carrying blanking interval of a single frame video signal. This eliminates any possibility of leaving magnetic remanence on the disc 1 at locations where information is recorded as a result of the absence of effective erasure during the zero crossover intervals of the erase current waveform, $I_e$. At the zero current level, erasing will not occur. If the zero crossover interval is too long relative to the speed of rotation of the disc 1, magnetic remanence will be on the disc 1 if the crossover occurs while the magnetic head 4 is in transductional relationship with a zone of a disc 1 in which recorded information exists.

A finite time is required to effect a transition between the opposite directions of current flow. However, if the transitions are accomplished sufficiently rapidly relative to the shortest wavelength of informational signals being recorded, no intolerable magnetic remanence will be left on the magnetic disc 1 during the zero crossover interval.

I claim:

1. A method of erasing recorded signals from a magnetic medium and conditioning the medium for re-recording comprising the steps of:
- generating a current of a stepped waveform including a plurality of successive current pulses of progressively decreasing levels of constant current alternating in the direction of current flow; and controlling the generation of the pulses included in the stepped waveform of current to have a period coinciding with the time for one revolution of the magnetic disc medium from which magnetically recorded signals are to be erased; and
- applying the current pulses to transduction means in transductional relationship to a selected track of the disc along which signals to be erased are recorded.

2. The method of claim 1 further including the step of positioning the transduction means in transductional relationship to the track to be erased for a number of disc revolutions, the number of revolutions coinciding with the number of pulses of the generated waveform.

3. The method of claim 1 wherein the generation of the pulses is controlled to have the said period by switching the current of the stepped waveform between the opposite directions of current flow in an interval equal to less than one wavelength of the signals to be recorded on the magnetic disc.

4. The method of claim 1 further including the step of adjusting the number of pulses and their respective levels while the transduction means is in transductional relationship with the selected track to reduce the magnetic remanence to a level less than that which is productive of intolerable distortion in a re-recorded signal.

5. The method of claim 4 in which the magnitude of the first pulse is adjusted for approximately −60db erasure and the magnitude of the second pulse is adjusted to obtain minimum second harmonic distortion on a re-recorded signal.

6. The method of claim 4 in which the absolute magnitude of successive pulses is approximately two-thirds that of the immediate preceding pulse.

7. The method of claim 1 further including:

the steps of:
- adjusting the number of pulses and their respective levels while the transduction means is in transductional relationship with the selected track to reduce the magnetic remanence to a level less than that which is productive of intolerable distortion in a re-recorded signal; and
- positioning the transduction means in transductional relationship to the track to be erased for a number of revolutions coinciding with the number of pulses of the generated waveform.

8. The method of claim 7 in which the current pulses are applied to the transduction means prior to re-record signals are applied to the same transduction means.

9. The method of claim 1 further including the steps of:
- detecting a tachometer mark in rotational registry with a particular circumferential position of the magnetic disc; and
- initiating the generation of the waveform of current in response to the detection of the tachometer mark.

10. The method of claim 9 in which the tachometer mark is located on the magnetic disc in a time related relation with a zone of the magnetic disc in which no information is recorded, and the waveform of current is generated to have its transitions between opposite directions of current flow occur while the erase transduction means is in a transductional relationship with the magnetic disc zone.

11. The method of claim 10 further including the step of initiating the recording of information along the erased disc track outside of said disc zone after the erased current pulses have been applied to the transduction means.

* * * * *